(12) United States Patent
Lin et al.

(10) Patent No.: US 11,054,866 B2
(45) Date of Patent: Jul. 6, 2021

(54) HINGE MODULE AND ELECTRONIC DEVICE

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/553,087

(22) Filed: Aug. 27, 2019

(65) Prior Publication Data
US 2020/0257341 A1 Aug. 13, 2020

(30) Foreign Application Priority Data
Feb. 13, 2019 (TW) ................................. 108104842

(51) Int. Cl.
*E05D 3/06* (2006.01)
*G06F 1/16* (2006.01)
(Continued)

(52) U.S. Cl.
CPC ........... *G06F 1/1681* (2013.01); *E05D 3/122* (2013.01); *E05D 11/06* (2013.01); *E05D 11/082* (2013.01);
(Continued)

(58) Field of Classification Search
CPC ........... Y10T 16/54038; Y10T 16/5403; E05D 11/06; E05D 11/08; E05D 11/081;
(Continued)

(56) References Cited

U.S. PATENT DOCUMENTS 5,697,125 A * 12/1997 Gannon ................ E05D 11/082
16/342
6,467,129 B1 * 10/2002 Bae ......................... B60J 3/0265
16/308
(Continued)

FOREIGN PATENT DOCUMENTS

| CN | 2876418 | 3/2007 |
| CN | 2895856 | 5/2007 |

(Continued)

OTHER PUBLICATIONS

"Office Action of Taiwan Counterpart Application," dated Nov. 11, 2019, p. 1-p. 6.
(Continued)

*Primary Examiner* — Chuck Y Mah
(74) *Attorney, Agent, or Firm* — JCIPRNET

(57) ABSTRACT

A hinge module includes a base, a torsional force providing structure, two axles, two brackets, and at least one fixing component. The base has at least one first concave. The torsional force providing structure is disposed in the base and has two torsional force providing portions. The two axles penetrate the two torsional force providing portions respectively. The two brackets are connected to the two axles respectively. The fixing component is disposed in the first concave and abuts the torsional force providing structure, such that the torsional force providing structure is fixed to the base. In addition, an electronic device including the hinge module is also provided.

18 Claims, 9 Drawing Sheets

130

(51) Int. Cl.
*F16C 11/04* (2006.01)
*E05D 3/12* (2006.01)
*E05D 11/10* (2006.01)
*E05D 11/06* (2006.01)
*E05D 11/08* (2006.01)

(52) U.S. Cl.
CPC ............ *E05D 11/105* (2013.01); *F16C 11/04* (2013.01); *E05Y 2900/606* (2013.01); *G06F 1/1616* (2013.01)

(58) Field of Classification Search
CPC ... E05D 11/082; E05D 11/084; E05D 11/085; E05D 11/087; E05D 11/10; E05D 11/105; E05D 2011/1035; E05D 3/122; E05Y 2900/606; E05Y 2201/49; G06F 1/1681; G06F 1/1616; H04M 1/0261; F16C 11/04
See application file for complete search history.

(56) References Cited

U.S. PATENT DOCUMENTS

| | | | | |
|---|---|---|---|---|
| 6,530,123 | B1* | 3/2003 | Wahlstedt | G06F 1/1616 16/337 |
| 7,607,202 | B1* | 10/2009 | Lee | G06F 1/1616 16/342 |
| 8,943,650 | B2* | 2/2015 | Anderson | E05D 11/082 16/342 |
| 9,206,633 | B1* | 12/2015 | Ju | G06F 1/1681 |
| 2007/0101543 | A1* | 5/2007 | Lu | G06F 1/1616 16/342 |
| 2009/0293229 | A1* | 12/2009 | Chiang | G06F 1/1681 16/342 |
| 2011/0232032 | A1* | 9/2011 | Chu | G06F 1/1681 16/221 |
| 2014/0059805 | A1* | 3/2014 | Krahn | G06F 1/1681 16/342 |
| 2014/0338483 | A1* | 11/2014 | Hsu | F16H 21/44 74/96 |
| 2015/0121654 | A1* | 5/2015 | Novin | E05D 3/02 16/273 |
| 2018/0112447 | A1* | 4/2018 | Hatano | E05D 3/12 |

FOREIGN PATENT DOCUMENTS

| | | | |
|---|---|---|---|
| CN | 202103985 | 1/2012 | |
| TW | M427764 | 4/2012 | |
| TW | M456066 | 6/2013 | |
| TW | 201816293 | 5/2018 | |
| WO | WO-2015064460 A1 * | 5/2015 | ........... F16D 41/088 |

OTHER PUBLICATIONS

"Office Action of China Counterpart Application", dated Dec. 23, 2020, p. 1-p. 12.

* cited by examiner

HINGE MODULE AND ELECTRONIC DEVICE

CROSS-REFERENCE TO RELATED APPLICATION

This application claims the priority benefit of Taiwan application serial no. 108104842, filed on Feb. 13, 2019. The entirety of the above-mentioned patent application is hereby incorporated by reference herein and made a part of this specification.

BACKGROUND

Technical Field

The invention relates to hinge module and an electronic device, and more particularly, the invention relates to a hinge module having a torsional force providing structure and an electronic device.

Description of Related Art

Benefitting from advancement of semiconductor components and display technology, development of electronic devices continues to move towards miniaturization, multi-function, and easy portability. Common portable electronic devices include tablet PCs, smart phones, notebook computers, and the like. Taking notebook computers for example, most of the notebook computers are formed by hosts and screens pivotally connected to each other. The host and screen of a notebook computer may relatively rotate, so that the notebook computer may be folded and allows a user to carry it around conveniently. When the user intends to use the notebook computer, the user may easily unfold the screen for operation.

Generally, a hinge module is disposed between the host and the screen of a notebook computer, so that the host and the screen are adapted to relatively rotate through the hinge module, and that the notebook computer may be unfolded or folded. The hinge module is required to provide a sufficient torsional force so that the screen standing on the host after the notebook computer is unfolded is fixed. One way to generate a torsional force is to allow an axle of the hinge module to penetrate a torsional force providing structure in a tightly fitting manner, and the frictional force between the torsional force providing structure and the axle may generate the torsional force. Nevertheless, if the torsional force providing structure is not securely fixed, the torsional force providing structure may be easily loosened or deviated from a normal position owing to rotation of the axles.

SUMMARY

The invention provides a hinge module and an electronic device capable of securely fixing a torsional force providing structure.

A hinge module in an embodiment of the invention includes a base, a torsional force providing structure, two axles, two brackets, and at least one fixing component. The base has at least one first concave. The torsional force providing structure is disposed in the base and has two torsional force providing portions. The two axles penetrate the two torsional force providing portions respectively. The two brackets are connected to the two axles respectively. The fixing component is disposed in the first concave and abuts the torsional force providing structure, such that the torsional force providing structure is fixed to the base.

An electronic device in an embodiment of the invention includes two bodies and a hinge module. The hinge module includes a base, a torsional force providing structure, two axles, two brackets, and at least one fixing component. The base has at least one first concave. The torsional force providing structure is disposed in the base and has two torsional force providing portions. The two axles penetrate the two torsional force providing portions respectively. The two brackets are connected to the two axles respectively, and the two bodies are connected to the two brackets respectively. The fixing component is disposed in the first concave and abuts the torsional force providing structure, such that the torsional force providing structure is fixed to the base.

In an embodiment of the invention, an opening side of the first concave faces the torsional force providing structure.

In an embodiment of the invention, the base has two position limiting protrusions therein, the torsional force providing structure is limited between the two position limiting protrusions, and the first concave is formed on at least one of the position limiting protrusions.

In an embodiment of the invention, a number of the at least one first concave is two, a number of the at least one fixing component is correspondingly two, the two first concaves are respectively located at two opposite sides of the torsional force providing structure, and the two fixing components respectively abut the two opposite sides of the torsional force providing structure.

In an embodiment of the invention, the torsional force providing structure includes two abutting portions separated from each other, and two opposite sides of the fixing component respectively abut the two abutting portions.

In an embodiment of the invention, the base has a wall portion therein, the wall portion covers one end of the first concave and has an opening hole, the opening hole is aligned with the first concave, and the fixing component penetrates the opening hole.

In an embodiment of the invention, the torsional force providing structure has at least one second concave, the first concave and the second concave are connected to each other to form a through hole, and the fixing component is disposed in the through hole.

In an embodiment of the invention, an opening side of the first concave and an opening side of the second concave face each other.

A hinge module in an embodiment of the invention includes a base, a torsional force providing structure, an axles, two brackets, and at least one fixing component. The base has at least one first concave. The torsional force providing structure is disposed in the base and has a torsional force providing portion and at least one second concave, and the first concave and the second concave are connected to each other to form a through hole. The axle penetrates the torsional force providing portion. The two brackets are connected to the axle and the base respectively. The fixing component is disposed in the through hole and abuts the torsional force providing structure, such that the torsional force providing structure is fixed to the base.

An electronic device in an embodiment of the invention includes two bodies and a hinge module. The hinge module includes a base, a torsional force providing structure, an axle, two brackets, and at least one fixing component. The base has at least one first concave. The torsional force providing structure is disposed in the base and has a torsional force providing portion and at least one second concave, and the first concave and the second concave are connected to each other to form a through hole. The axle penetrates the torsional force providing portion. The two brackets are connected to the axle and the base respectively, and the two bodies are connected to the two brackets respectively. The fixing component is disposed in the through hole and abuts the torsional force providing structure, such that the torsional force providing structure is fixed to the base.

In an embodiment of the invention, an opening side of the first concave and an opening side of the second concave face each other.

In an embodiment of the invention, the base has a wall portion therein, the wall portion covers one end of the first concave and has an opening hole, the opening hole is aligned with the first concave, and the fixing component penetrates the opening hole.

To sum up, in the hinge module of the invention, the base includes the concave and the fixing component may be disposed in the concave, and the torsional force providing structure in the base may be securely fixed to the base through abutting of the fixing component. Accordingly, the torsional force providing structure is prevented from being unexpectedly loosened or deviated from a normal position as affected by rotation of the axles.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
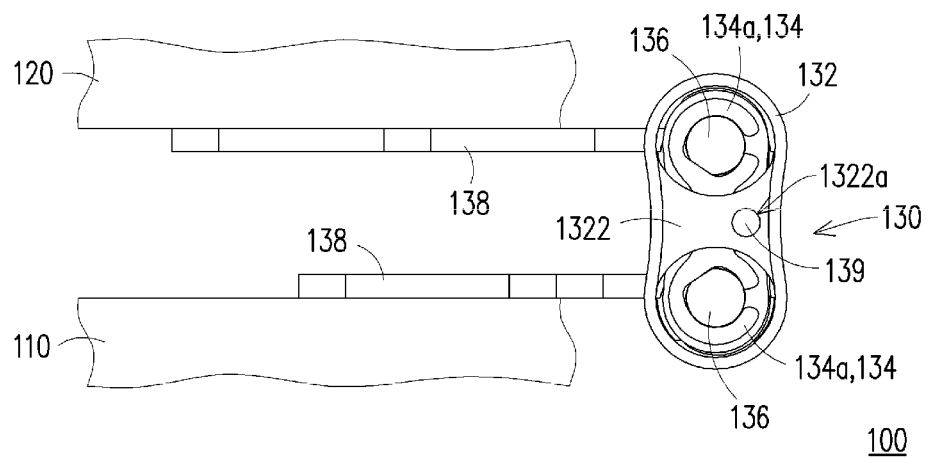
FIG. 1 is a local side view of an electronic device according to an embodiment of the invention.

FIG. 1 is a local side view of an electronic device according to an embodiment of the invention. With reference to FIG. 1, an electronic device 100 of this embodiment includes two bodies 110 and 120 and a hinge module 130. The electronic device 100 is, for example, a notebook computer, and the two bodies 110 and 120 respectively are, for example, a host and a screen of the notebook computer, and are pivotally connected to each other through the hinge module 130.

Figure 2:
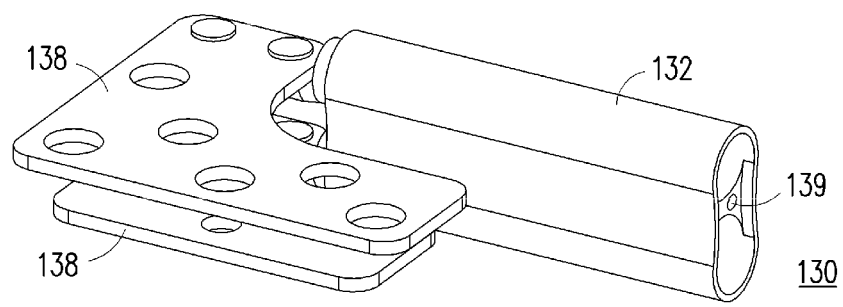
FIG. 2 is a three-dimensional view of the hinge module of FIG. 1.
Figure 3:
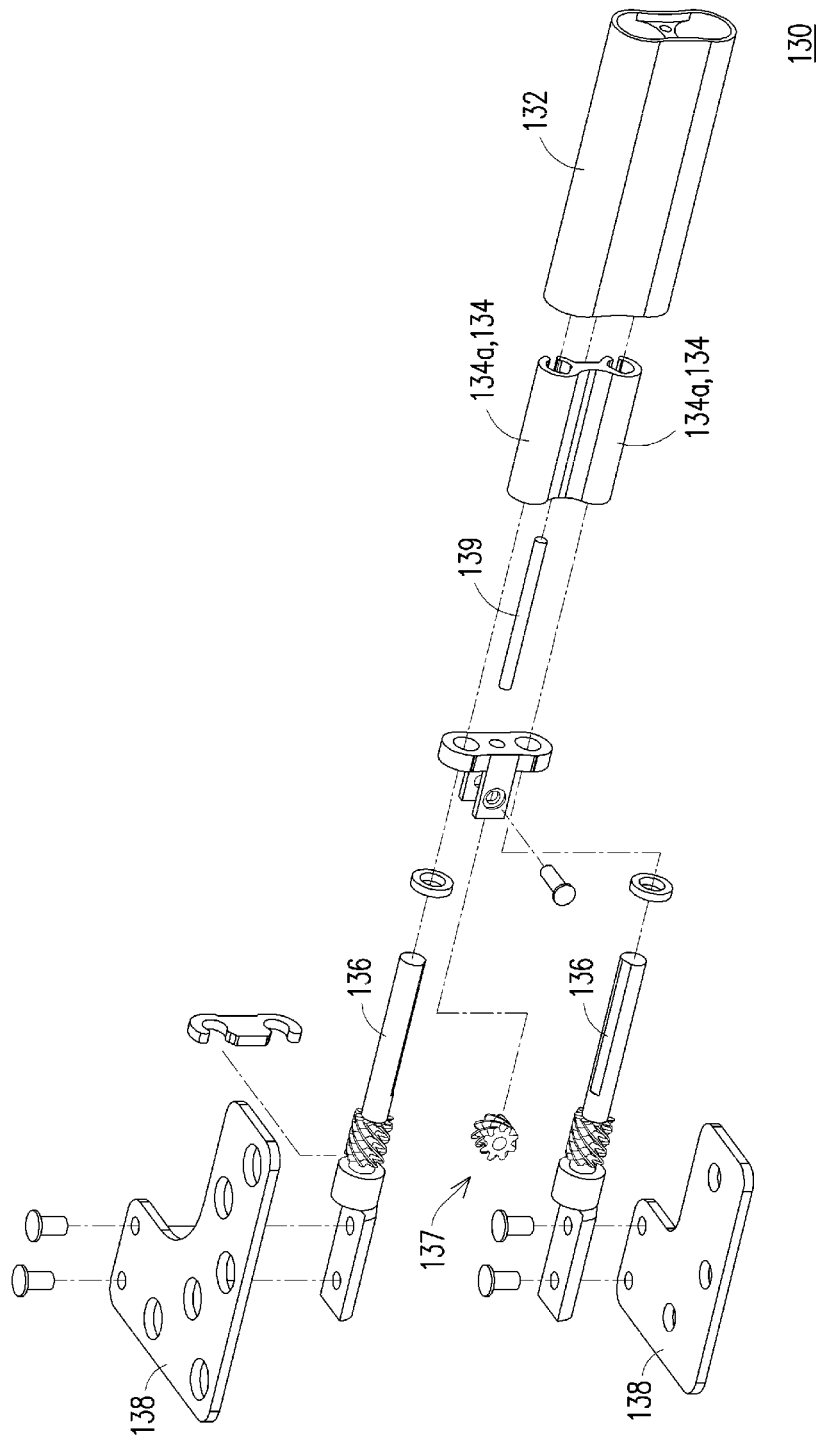
FIG. 3 is an exploded view of the hinge module of FIG. 2.

FIG. 2 is a three-dimensional view of the hinge module of FIG. 1. FIG. 3 is an exploded view of the hinge module of FIG. 2. With reference to FIG. 1 to FIG. 3, the hinge module 130 of this embodiment includes a base 132, a torsional force providing structure 134, two axles 136, and two brackets 138. The torsional force providing structure 134 is disposed in the base 132 and has two torsional force providing portions 134a. The two torsional force providing portions 134a are, for example, two C-shaped structures, and the two axles 136 penetrate the two torsional force providing portions 134a in a tightly fitting manner, as such, a torsional force is generated owing to a frictional force generated between each of the axles 136 and the corresponding torsional force providing portion 134a. The two brackets 138 are connected to the two axles 136, and the two bodies 110 and 120 are connected to the two brackets 138 respectively. The two bodies 110 and 120 may be relatively unfolded or folded along with rotation of the two axles 136.

In this embodiment, the hinge module 130, may further include a gear assembly 137 as shown in FIG. 3, and the gear assembly 137 is coupled between the two axles 136, so that the two axles 136 are linked up through the gear assembly 137. In other embodiments, the two axles 136 may be linked up through other appropriate linking assemblies, or no linking assembly is required to be disposed between the two axles 136, which is not limited by the invention in this regard.

Figure 4:
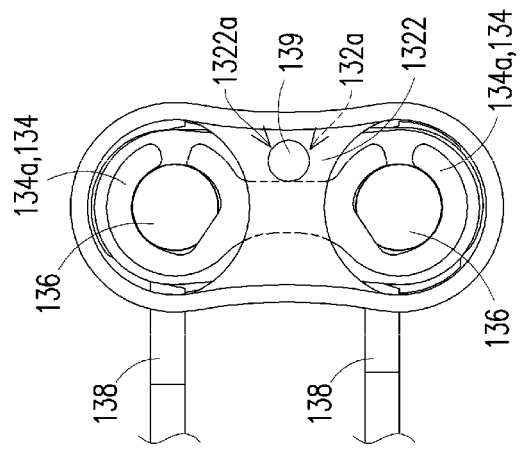
FIG. 4 is a three-dimensional view of part of components of the hinge module of FIG. 2.
Figure 5:
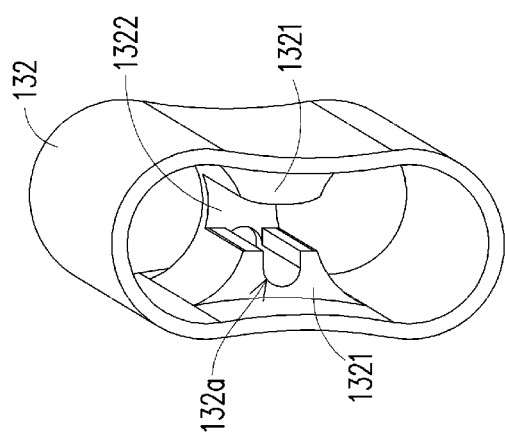
FIG. 5 is a three-dimensional view of the base of FIG. 4.
Figure 6:
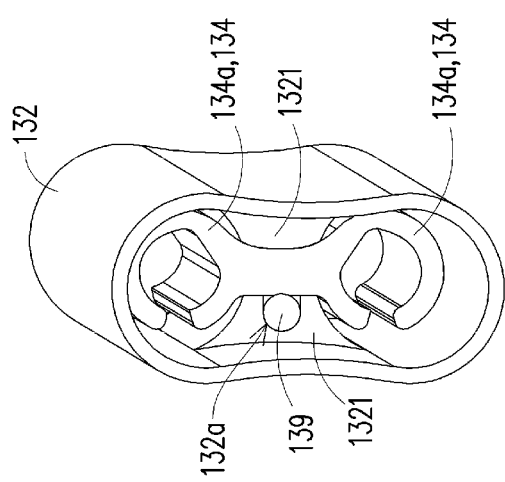
FIG. 6 is a perspective view of a local structure of the hinge module of FIG. 2.

FIG. 4 is a three-dimensional view of part of components of the hinge module of FIG. 2. FIG. 5 is a three-dimensional view of the base of FIG. 4. FIG. 6 is a perspective view of a local structure of the hinge module of FIG. 2. With reference to FIG. 4 to FIG. 6, in this embodiment, the base 132 has two position limiting protrusions 1321 therein, and the torsional force providing structures 134 is limited between the two position limiting protrusions 1321. The hinge module 130 further includes a fixing component 139, the base 132 has a first concave 132a, the first concave 132a is formed on one position limiting protrusion 1321, and an opening side of the first concave 132a faces the torsional force providing structures 134. The fixing component 139 is, for example, a bolt disposed in the first concave 132a and abuts the torsional force providing structure 134 in a tightly fitting manner. In this way, the torsional force providing structure 134 is securely fixed to the base 132, such that the torsional force providing structure 134 is prevented from being unexpectedly loosened or deviated from a normal position as affected by rotation of the axles 136.

Figure 7:
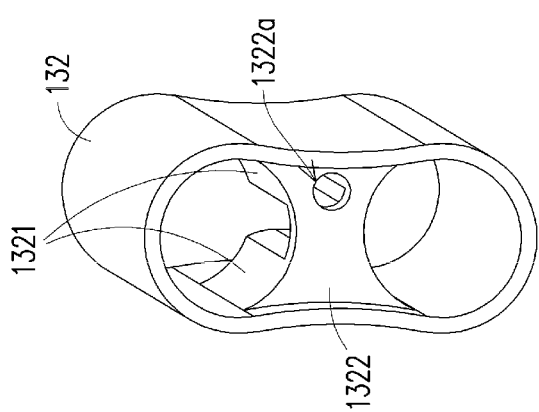
FIG. 7 is a three-dimensional view of the base of FIG. 5 from another viewing angle.

FIG. 7 is a three-dimensional view of the base of FIG. 5 from another viewing angle. With reference to FIG. 7, in this embodiment, the base 132 has a wall portion 1322 therein. The wall portion 1322 covers one end of the first concave 132a and has an opening hole 1322a, the opening hole 1322a is aligned with the first concave 132a, and the fixing component 139 penetrates the opening hole 1322a to be securely disposed in the base 132.

Figure 8:
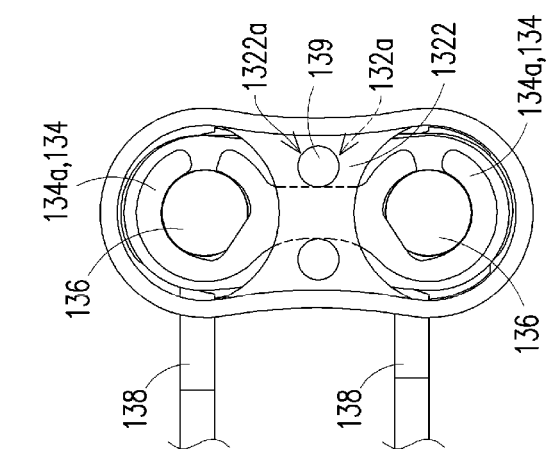
FIG. 8 is a perspective view of a local structure of a hinge module according to another embodiment of the invention.

FIG. 8 is a perspective view of a local structure of a hinge module according to another embodiment of the invention. The difference between the embodiment of FIG. 8 and the embodiment of FIG. 6 is that a number of the first concave 132a of FIG. 8 is two, a number of the fixing component 139 is correspondingly two. The two first concaves 132a are respectively located at two opposite sides of the torsional force providing structure 134, and the two fixing components 139 respectively abut the two opposite sides of the torsional force providing structure 134 so that the torsional force providing structure 134 is more securely fixed.

Figure 9:
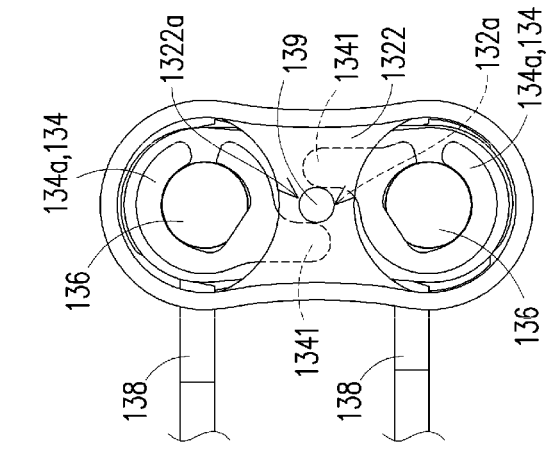
FIG. 9 is a perspective view of a local structure of a hinge module according to another embodiment of the invention.

FIG. 9 is a perspective view of a local structure of a hinge module according to another embodiment of the invention. The difference between the embodiment of FIG. 9 and the embodiment of FIG. 6 is that the torsional force providing structure 134 of FIG. 9 includes two abutting portions 1341 separated from each other, and two opposite sides of the fixing component 139 respectively abut the two abutting portions 1341.

Figure 10:
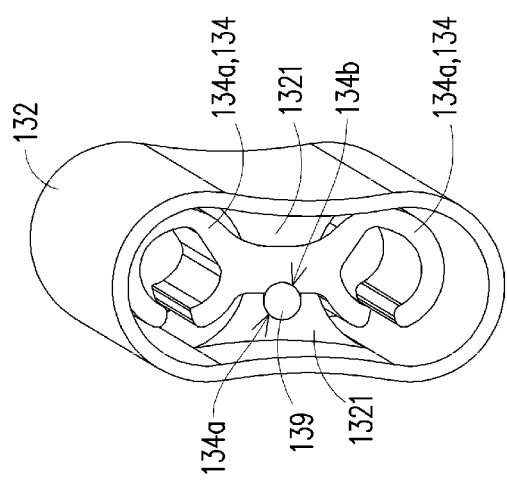
FIG. 10 is a three-dimensional view of part of components of a hinge module according to another embodiment of the invention.

FIG. 10 is a three-dimensional view of part of components of a hinge module according to another embodiment of the invention. The difference between the embodiment of FIG. 10 and the embodiment of FIG. 4 is that the torsional force providing structure 134 of FIG. 10 has at least one second concave 134b. The opening side of the first concave 132a and an opening side of the second concave 134b face each other, the first concave 132a and the second concave 134b are connected to each other to form a through hole, and the fixing component 139 is disposed in the through hole. As such, the fixing component 139 may be more securely combined with the torsional force providing structure 134, so that the torsional force providing structure 134 is prevented from being loosened more effectively.

Figure 11:
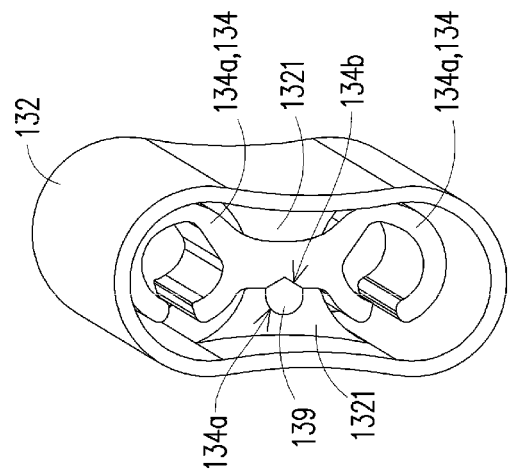
FIG. 11 is a three-dimensional view of part of components of a hinge module according to another embodiment of the invention.

FIG. 11 is a three-dimensional view of part of components of a hinge module according to another embodiment of the invention. The difference between the embodiment of FIG. 11 and the embodiment of FIG. 10 is that a shape of a position at which the second concave 134b and the fixing component 139 are connected in FIG. 11 is V-shaped instead of arc-shaped as shown at the position at which the second concave 134b and the fixing component 139 of FIG. 10 are connected. In other embodiments, the shape of the position at which the second concave 134b and the fixing component 139 are connected may be shaped as other appropriate shapes, which is not limited by the invention in this regard.

Figure 12:
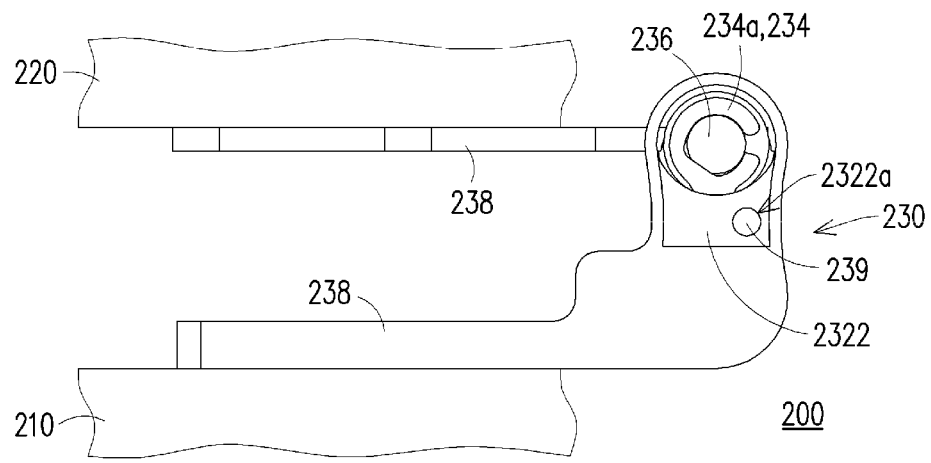
FIG. 12 is a local side view of an electronic device according to another embodiment of the invention.

FIG. 12 is a local side view of an electronic device according to another embodiment of the invention. With reference to FIG. 12, an electronic device 200 of this embodiment includes two bodies 210 and 220 and a hinge module 230. The electronic device 200 is, for example, a notebook computer, and the two bodies 210 and 220 respectively are, for example, a host and a screen of the notebook computer, and are pivotally connected to each other through the hinge module 230.

Figure 13:
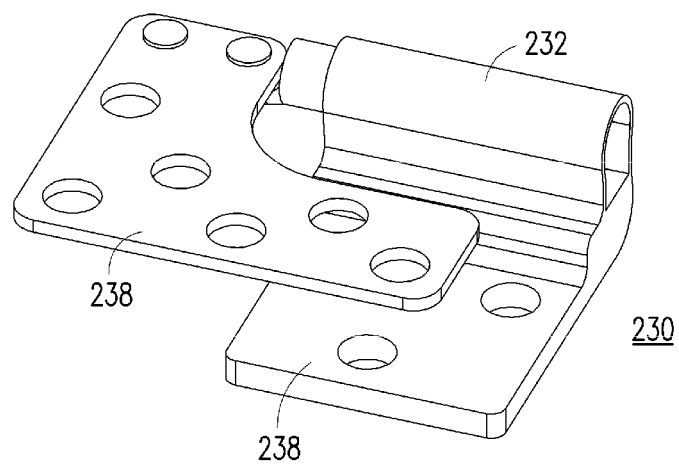
FIG. 13 is a three-dimensional view of the hinge module of FIG. 12.
Figure 14:
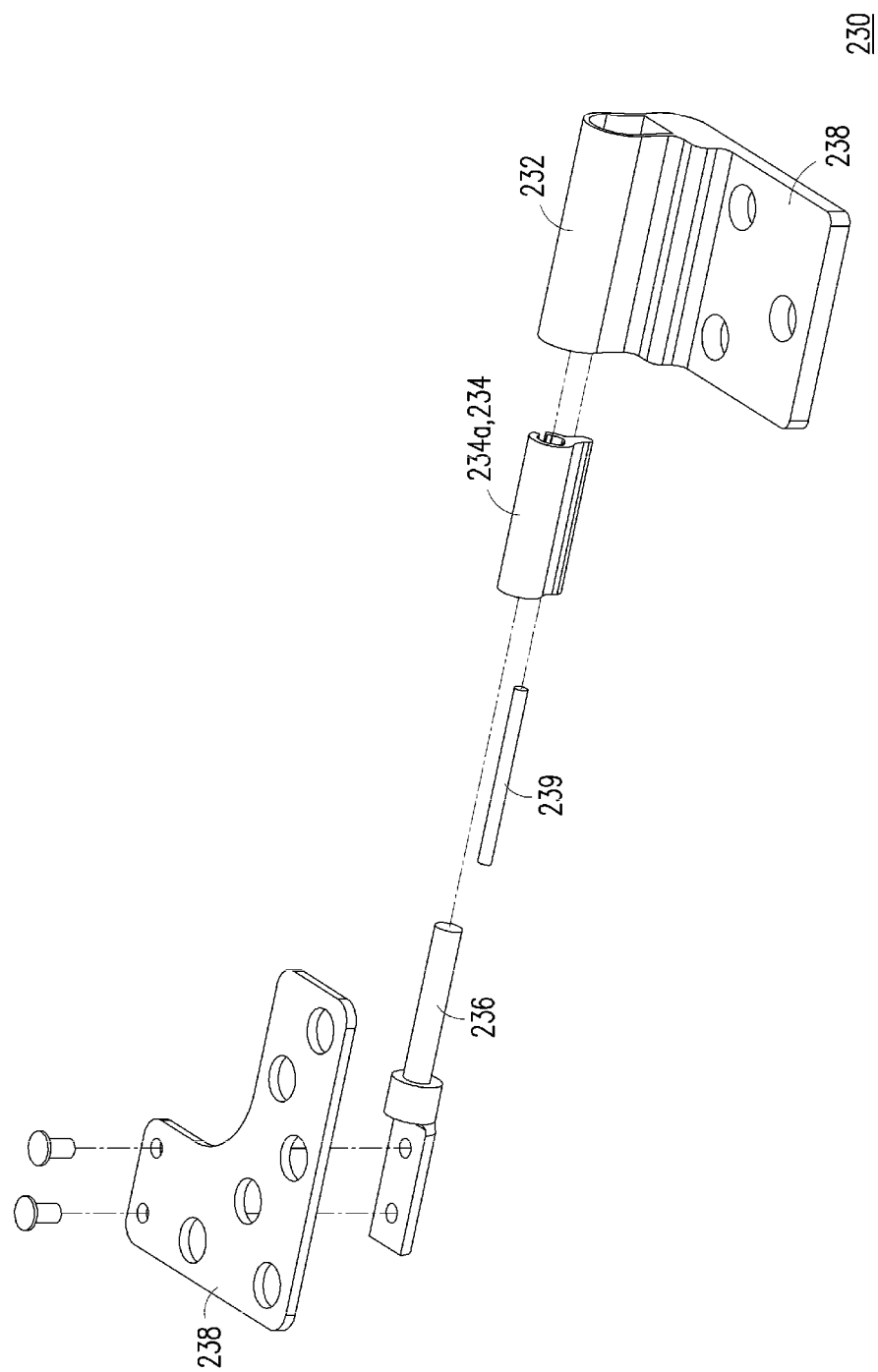
FIG. 14 is an exploded view of the hinge module of FIG. 13.

FIG. 13 is a three-dimensional view of the hinge module of FIG. 12. FIG. 14 is an exploded view of the hinge module of FIG. 13. With reference to FIG. 12 to FIG. 14, the hinge module 230 of this embodiment includes a base 232, a torsional force providing structure 234, an axle 236, and two brackets 238. The torsional force providing structure 234 is disposed in the base 232 and has a torsional force providing portion 234a. The torsional force providing portion 234a is, for example, a C-shaped structure, and the axle 236 penetrates the torsional force providing portion 234a in a tightly fitting manner, as such, a torsional force is generated owing to a frictional force generated between the axle 236 and the torsional force providing portion 234a. The two brackets 238 are respectively connected to the axle 236 and the base 232, and the two bodies 210 and 220 are connected to the two brackets 238. The two bodies 210 and 220 may be relatively unfolded or folded along with rotation of the axle 236.

Figure 15:
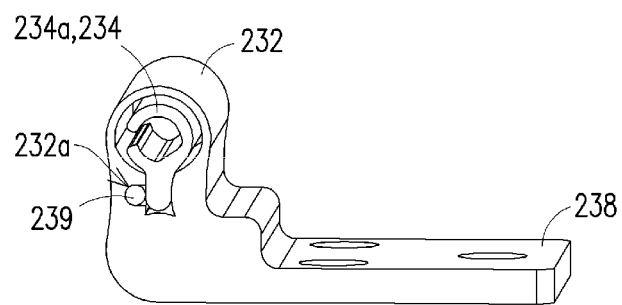
FIG. 15 is a three-dimensional view of part of components of the hinge module of FIG. 13.
Figure 16:
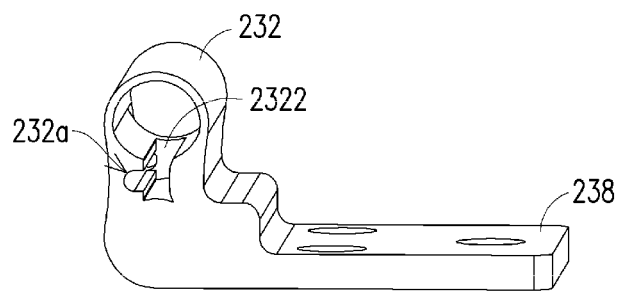
FIG. 16 is a three-dimensional view of the base of FIG. 15.

FIG. 15 is a three-dimensional view of part of components of the hinge module of FIG. 13. FIG. 16 is a three-dimensional view of the base of FIG. 15. With reference to FIG. 15 and FIG. 16, in this embodiment, the hinge module 230 further includes a fixing component 239. The base 232 has a first concave 232a, and an opening side of the first concave 232a faces the torsional force providing structure 234. The fixing component 239 is, for example, a bolt disposed in the first concave 232a and abuts the torsional force providing structure 234 in a tightly fitting manner. In this way, the torsional force providing structure 234 is securely fixed to the base 232, such that the torsional force providing structure 234 is prevented from being unexpectedly loosened or deviated from a normal position as affected by rotation of the axles 236.

Figure 17:
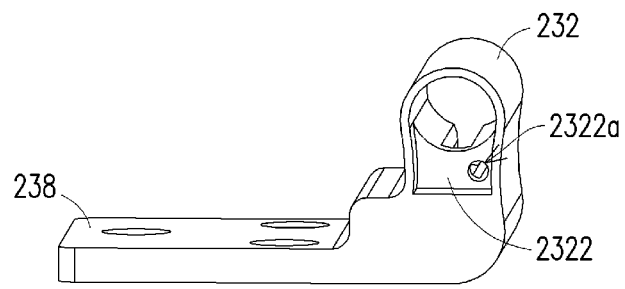
FIG. 17 is a three-dimensional view of the base of FIG. 16 from another viewing angle.

FIG. 17 is a three-dimensional view of the base of FIG. 16 from another viewing angle. With reference to FIG. 17, in this embodiment, the base 232 has a wall portion 2322 therein. The wall portion 2322 covers one end of the first concave 232a and has an opening hole 2322a, the opening hole 2322a is aligned with the first concave 232a, and the fixing component 239 penetrates the opening hole 2322a to be securely disposed in the base 232.

Figure 18:
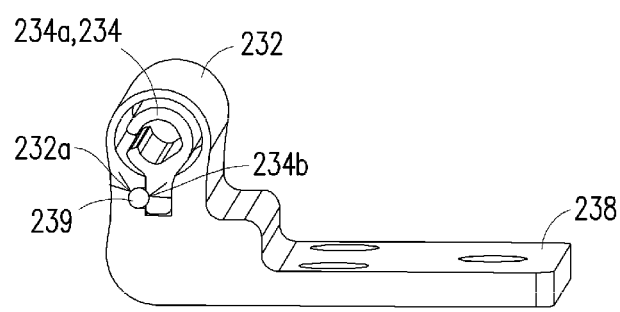
FIG. 18 is a three-dimensional view of part of components of a hinge module according to another embodiment of the invention.

FIG. 18 is a three-dimensional view of part of components of a hinge module according to another embodiment of the invention. The difference between the embodiment of FIG. 18 and the embodiment of FIG. 15 is that the torsional force providing structure 234 of FIG. 18 has at least one second concave 234b. The opening side of the first concave 232a and an opening side of the second concave 234b face each other, the first concave 232a and the second concave 234b are connected to each other to form a through hole, and the fixing component 239 is disposed in the through hole. As such, the fixing component 239 may be more securely combined with the torsional force providing structure 234, so that the torsional force providing structure 234 is prevented from being loosened more effectively.

In view of the foregoing, in the hinge module of the invention, the base includes the concave and the fixing component may be disposed in the concave, and the torsional force providing structure in the base may be securely fixed to the base through abutting of the fixing component. Accordingly, the torsional force providing structure is prevented from being unexpectedly loosened or deviated from a normal position as affected by rotation of the axles. In addition, the torsional force providing structure may include another concave, so that the fixing component is disposed in the through hole formed by the concave of the base and the concave of the torsional force providing structure, and that the fixing component and the torsional force providing structure are combined more securely.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hinge module, comprising:
   a base, having at least one first concave;
   a torsional force providing structure, disposed in the base and having two torsional force providing portions;
   two axles, penetrating the two torsional force providing portions respectively;
   two brackets, connected to the two axles respectively; and
   at least one fixing component, disposed in the at least one first concave and abutting the torsional force providing structure, such that the torsional force providing structure is fixed to the base, wherein the base has a wall portion therein, the wall portion covers one end of the at least one first concave and has an opening hole, the opening hole is aligned with the at least one first concave, and the at least one fixing component penetrates the opening hole.

2. The hinge module as claimed in claim 1, wherein an opening side of the at least one first concave faces the torsional force providing structure.

3. The hinge module as claimed in claim 1, wherein the base has two position limiting protrusions therein, the torsional force providing structure is limited between the two position limiting protrusions, and the at least one first concave is formed on at least one of the position limiting protrusions.

4. The hinge module as claimed in claim 1, wherein a number of the at least one first concave is two, a number of the at least one fixing component is two, the two first concaves are respectively located at two opposite sides of the torsional force providing structure, and the two fixing components respectively abut the two opposite sides of the torsional force providing structure.

5. The hinge module as claimed in claim 1, wherein the torsional force providing structure comprises two abutting portions separated from each other, and two opposite sides of the at least one fixing component respectively abut the two abutting portions.

6. The hinge module as claimed in claim 1, wherein the torsional force providing structure has at least one second concave, the at least one first concave and the at least one second concave are connected to each other to form a through hole, and the at least one fixing component is disposed in the through hole.

7. The hinge module as claimed in claim 6, wherein an opening side of the at least one first concave and an opening side of the at least one second concave face each other.

8. A hinge module, comprising:
   a base, having at least one first concave;
   a torsional force providing structure, disposed in the base and having a torsional force providing portion and at least one second concave, wherein the at least one first concave and the at least one second concave are connected to each other to form a through hole;
   an axle, penetrating the torsional force providing portion;
   two brackets, connected to the axle and the base respectively; and
   at least one fixing component, disposed in the through hole and abutting the torsional force providing structure, such that the torsional force providing structure is fixed to the base, wherein the base has a wall portion therein, the wall portion covers one end of the at least one first concave and has an opening hole, the opening hole is aligned with the at least one first concave, and the at least one fixing component penetrates the opening hole.

9. The hinge module as claimed in claim 8, wherein an opening side of the at least one first concave and an opening side of the at least one second concave face each other.

10. An electronic device, comprising:
    two bodies; and
    a hinge module, comprising:
      a base, having at least one first concave;
      a torsional force providing structure, disposed in the base and having two torsional force providing portions;
      two axles, penetrating the two torsional force providing portions respectively;
      two brackets, connected to the two axles respectively, wherein the two bodies are connected to the two brackets respectively; and
      at least one fixing component, disposed in the at least one first concave and abutting the torsional force providing structure, such that the torsional force providing structure is fixed to the base, wherein the base has a wall portion therein, the wall portion covers one end of the at least one first concave and has an opening hole, the opening hole is aligned with the at least one first concave, and the at least one fixing component penetrates the opening hole.

11. The electronic device as claimed in claim 10, wherein an opening side of the at least one first concave faces the torsional force providing structure.

12. The electronic device as claimed in claim 10, wherein the base has two position limiting protrusions therein, the torsional force providing structure is limited between the two position limiting protrusions, and the at least one first concave is formed on at least one of the position limiting protrusions.

13. The electronic device as claimed in claim 10, wherein a number of the at least one first concave is two, a number of the at least one fixing component is two, the two first concaves are respectively located at two opposite sides of the torsional force providing structure, and the two fixing components respectively abut the two opposite sides of the torsional force providing structure.

14. The electronic device as claimed in claim 10, wherein the torsional force providing structure comprises two abutting portions separated from each other, and two opposite sides of the at least one fixing component respectively abut the two abutting portions.

15. The electronic device as claimed in claim 10, wherein the torsional force providing structure has at least one second concave, the at least one first concave and the at least one second concave are connected to each other to form a through hole, and the at least one fixing component is disposed in the through hole.

16. The electronic device as claimed in claim 10, wherein an opening side of the at least one first concave and an opening side of the at least one second concave face each other.

17. An electronic device, comprising:
    two bodies; and
    a hinge module, comprising:
      a base, having at least one first concave;
      a torsional force providing structure, disposed in the base and having a torsional force providing portion and at least one second concave, wherein the at least one first concave and the at least one second concave are connected to each other to form a through hole;

an axle, penetrating the torsional force providing portion;

two brackets, connected to the axle and the base respectively, wherein the two bodies are connected to the two brackets respectively; and at least one fixing component, disposed in the through hole and abutting the torsional force providing structure, such that the torsional force providing structure is fixed to the base, wherein the base has a wall portion therein, the wall portion covers one end of the at least one first concave and has an opening hole, the opening hole is aligned with the at least one first concave, and the at least one fixing component penetrates the opening hole.

18. The electronic device as claimed in claim 17, wherein an opening side of the at least one first concave and an opening side of the at least one second concave face each other.

* * * * *